Feb. 20, 1923. 1,445,763.
W. T. GIBBS ET AL
COLLAPSIBLE MINNOW TRAP.
FILED AUG. 29, 1921. 2 SHEETS—SHEET 1.
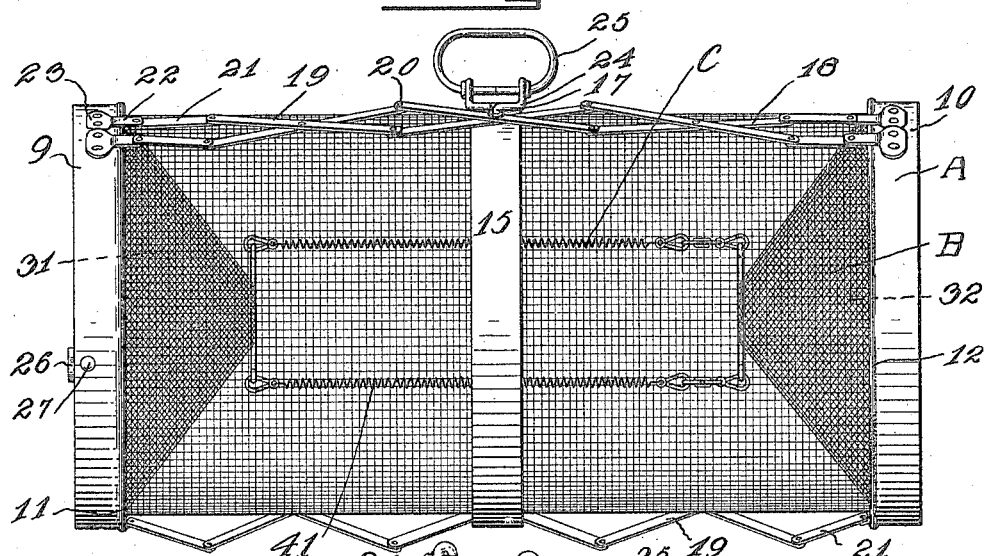
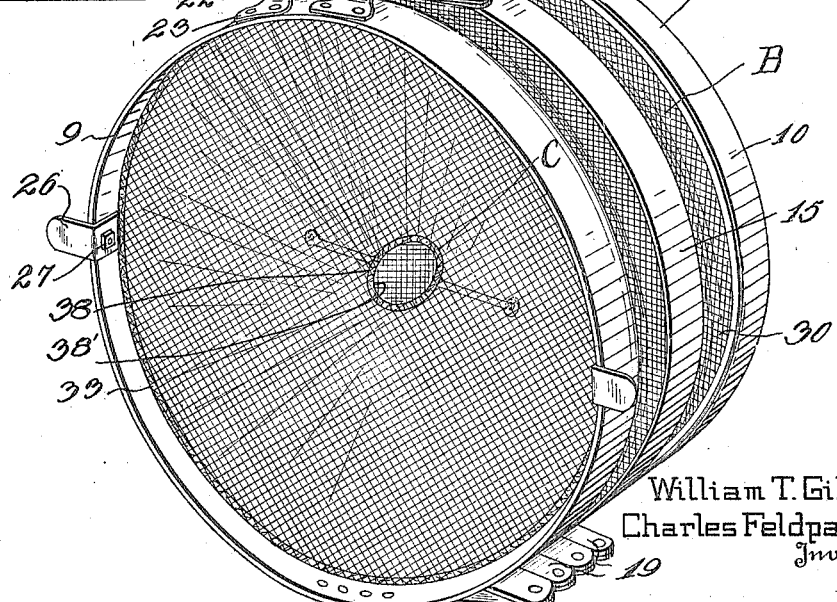
William T. Gibbs.
Charles Feldpausch.
Inventors Feb. 20, 1923. 1,445,763.
W. T. GIBBS ET AL
COLLAPSIBLE MINNOW TRAP.
FILED AUG. 29, 1921.
2 SHEETS—SHEET 2.
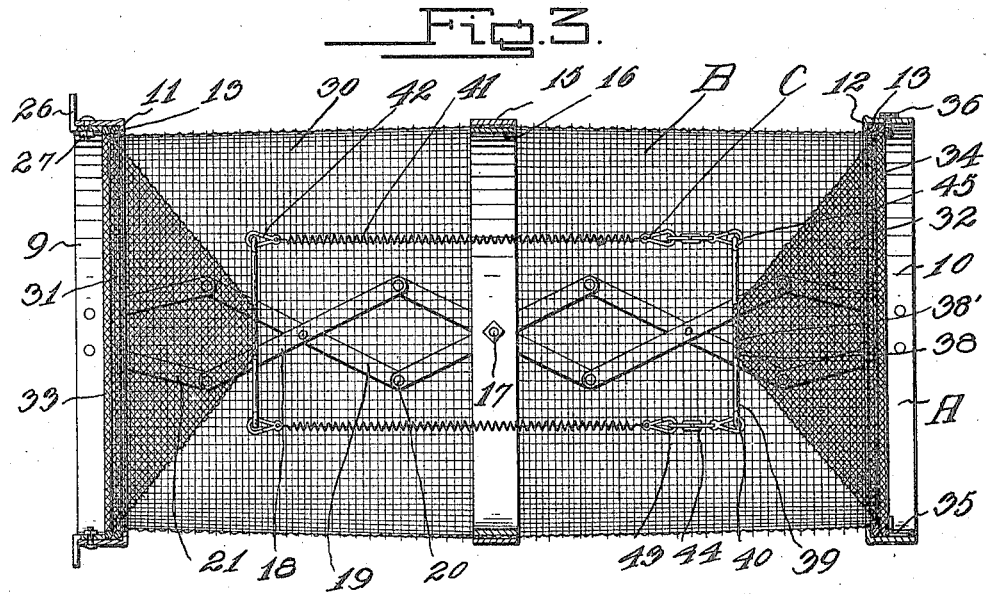
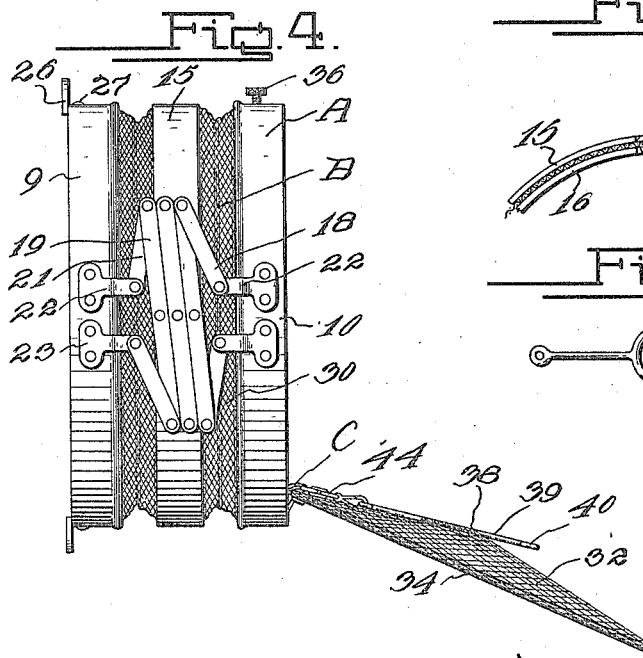
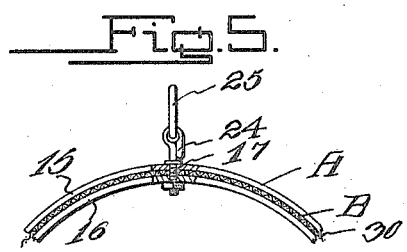
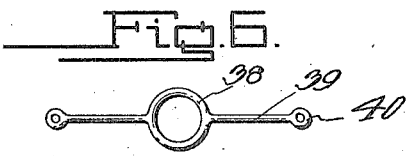
William T. Gibbs.
Charles Feldpausch.
Inventors Patented Feb. 20, 1923.

1,445,763

UNITED STATES PATENT OFFICE.

WILLIAM T. GIBBS AND CHARLES FELDPAUSCH, OF RUSSELL, KENTUCKY.

COLLAPSIBLE MINNOW TRAP.

Application filed August 29, 1921. Serial No. 496,479.

*To all whom it may concern:*

Be it known that we, WILLIAM T. GIBBS and CHARLES FELDPAUSCH, citizens of the United States, residing at Russell, in the county of Greenup and State of Kentucky, have invented certain new and useful Improvements in Collapsible Minnow Traps, of which the following is a specification.

This invention relates to fish traps, and more particularly to traps for catching minnows or other small fish, which can be used for bait, and the primary object of the present invention is to provide a novel minnow trap, which can be readily folded or collapsed, so as to occupy a minimum amount of space during shipping or storing, and rendering the trap particularly adaptable for fishermen going on fishing trips.

Another object of the invention is to provide a novel collapsible minnow trap having an improved frame, which renders the trap rigid and strong, when in its extended open position.

A further object of the invention is the provision of novel means whereby the net portions of the trap can be readily replaced, when worn, with a minimum amount of time and effort.

A still further object of the invention is to provide an improved collapsible minnow trap of the above character, which will be durable and efficient in use, one which will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a side elevation of the improved trap, showing the same in its extended open operative position.

Figure 2 is a perspective view of the improved trap, showing the same in its collapsed position.

Figure 3 is a longitudinal section through the improved trap, showing the trap in its extended operative position.

Figure 4 is a plan view of the trap showing the same in its collapsed position, and one end wall thereof swung open so as to facilitate the removal of the fish therefrom.

Figure 5 is a detail fragmentary transverse section through the central portion of the trap, illustrating the means of connecting the central bows or hoops together for holding the net portion of the trap in place.

Figure 6 is a detail plan view of one of the members, which is connected to the apex of the conical portions of the trap.

Referring to the drawings in detail, wherein similar reference characters designate corresponding parts throughout the several views, the letter A indicates the frame of the trap, B the net portion of the trap and C, the means for holding the conical sections of the net portion of the trap in their operative position, when the trap is in its extended operative position.

The frame A of the trap is of a novel construction and forms an important part of the invention. As shown the same includes the end hoops or bands 9 and 10, which are preferably formed of metal, and suitably galvanized, so as to resist the action of water thereon. The inner edges of these hoops or bands 9 and 10 are provided with inwardly extending right angular flanges 11 and 12, which form a seat for the retainer rings 13, which are of a resilient nature. These rings 13 are adapted to be sprung into position and form the means for holding the net portion of the trap in place, as will be hereinafter more fully described.

Disposed intermediate the end hoops or bands 9 and 10 is the central hoop or band 15. This band has fitting therein a removable hoop or band 16, and these two hoops or bands 15 and 16 also form means for holding the net portion of the trap B in position, as will be hereinafter more fully apparent. These hoops are connected together by removable bolts 17, which act as pivots for the central portion of the collapsible brace members 18 for the trap.

The collapsible brace members 18 are of a lazy tong construction and include a plurality of pivotally connected cross levers 19. The terminals of these levers are also pivotally connected together as at 20. The outer terminals of the end pair of cross levers 19 are pivotally connected to links 21, which are in turn pivotally connected to ears 22, which are riveted as at 23 to the end bands or hoops 9 and 10. The intermediate pair of cross levers 19 are pivoted upon the bolts 17, as heretobefore stated. It can be seen that by this construction, the trap will be of a rigid and strong construction, when in its extended operative position, as well as when it is in its collapsed folded condition.

One of the bolts 17 is extended and bent to form a loop 24 for a handle 25, which facilitates the carrying of the trap. Owing to the means of mounting the bolts 17 on the hoops 15 and 16, the handle 25 can be readily swung to any position on the trap which may be desired by the user thereon. The hoop or band 9 is provided at directly diametrically opposite points with outwardly extending feet 26, which are of angle iron construction. These feet form means or grips by which the user of the device can engage the trap when he desires to pull the trap to an extended position. These outwardly extending feet 26 are held in place by removable bolts or the like 27.

The net portion B of the trap consists of three sections, namely a cylindrical body section 30, and end conical sections 31 and 32. The sections 30, 31 and 32 can be made of any desired mesh and of course are freely foldable, and are so disposed in relation to the frame portion A of the trap as to permit the same to be readily removed and replaced by new parts when worn or torn. The ends of the cylindrical body portions 30 of the net part of the trap B can be folded around the rings 13 and sewed or otherwise secured in place, and it can be seen that when these rings are sprung in position, the body section 30 will be held in place. The hoops or bands 15 and 16 are disposed respectively on the outer and inner sides of the body portion 30 at the central portion thereof and serve as means to firmly clamp the net and thus hold the same in position against slipping.

The conical portions 30 and 32 have their enlarged or base portions secured respectively to rings 33 and 34, which are also adapted to be brought into the hoops or bands 9 and 10. These rings 33 and 34 abut the rings 13, and the ring 33 is held against accidental displacement by means of the feet 26, the inner ends of which abut the same.

The ring 34 is secured, by means of a hinge 35, to the hoop 10, and this ring forms means for swinging the conical portion 32 outwardly in order to permit free access to be had to the trap, so as to allow the ready removal of the fish therefrom. The ring 34 is adapted to be engaged at a point diametrically opposite the hinge 35 by means of a set screw 36, which is adjustably carried by the hoop 10. The set screw 36 holds the ring against accidental swinging movement, and it can be seen that when it is desired to swing the ring outwardly, it is merely necessary to turn the set screw 36, so as to feed the same outwardly of the hoop or band 10.

The apex portion of the sections 30 and 31 are cut off, so as to define relatively narrow circular entrance openings 38' for the fish. As clearly shown in Figures 1 to 4 of the drawings, the apex portions of the sections 31 and 32 are folded around rings 38 and the apex portion can be sewed in place if so desired. The rings 38 are provided at diametrically opposite points with outwardly extending arms 39, which terminate in eyes 40. These rings 38 form a part of the connecting means C for holding the conical sections 31 and 32 in their operative positions when the trap is in its extended position. The connecting means C include contractile coil springs 41. One of the terminals of the springs 41 carry clips 42, which are adapted to engage the eyes 40 formed on the arms 39 carried by one of the rings 38. The other terminal of the contractile coil springs 41 carry clips 43, which engage chains 44, the terminals of which also carry clips 45 for engaging the eyes 40 of the other ring member 38. It can be seen that these springs normally tend to pull the conical sections 31 and 32 inwardly so as to extend the same and hold the same in their operative positions. These springs are, of course, too weak to pull the trap to its collapsed position.

When it is desired to remove the fish from the trap, it is merely necessary to feed the set screw 36 outwardly as heretobefore described, and swing the ring 34 outwardly a slight distance, and then insert the hand into the trap and unhook one of the clips 45 from one of the eyes 40 and then swing the ring 34 downward to a full open position as clearly shown in Figure 4 of the drawing.

When it is desired to collapse the trap, it is merely necessary to rest the hoop or band 9 upon the ground and then press downwardly on the hoop or band 10. When it is desired to extend the trap to its opposite position, the band 9 is placed in engagement with the ground or other support, and the feet 26 are engaged by the feet of the user and the band 10 is then grasped by the hands of the user and pulled outwardly until the trap reaches its extended position.

From the foregoing description, it can be seen that an exceptionally simple and durable trap has been provided which can be readily moved to its extended operative position or readily moved to its collapsed position, and which embodies a minimum number of parts, none of which are subjected to undue wear.

In use of the trap, the same is submerged in the stream, and the funnel or conical sections 31 and 32, serve to guide the minnows toward the inlet openings 38' and into the body portion of the trap. Once the minnows are within the trap, the inclined sides of the conical sections of the trap will guide the minnows toward the wall of the central or body section 30 and thus away from the openings 38'. When minnows which have been caught are desired, they may be readily removed by swinging open the section 32 as heretobefore described.

Changes in details may be made without departing from the spirit or scope of this invention; but,

We claim:

1. A fish trap comprising a pair of end hoops, a collapsible frame connecting the hoops together, and foldable netting attached to the hoops including a cylindrical body portion extending between the hoops and end conical portions carried by the hoops.

2. A fish trap comprising a pair of end hoops, a centrally disposed intermediate hoop, a pair of longitudinally extending diametrically opposite frames pivotally secured to the intermediate hoop and to the end hoop, and foldable netting including a cylindrical body portion extending between said end and intermediate hoops and end conical portions carried by said end hoops.

3. A trap comprising a pair of end hoops, an intermediate centrally disposed hoop, all of said hoops being in direct alignment, a collapsible frame connecting the hoops together for permitting the end hoops to be moved toward and away from the central hoop, foldable netting including a central body section extending between said end and intermediate hoops and end conical sections carried by said end hoops, and means permitting one of the end conical sections to be swung outwardly of the body section.

4. A fish trap comprising a pair of end hoops, means connecting the hoops together for permitting said hoops to be moved toward and away from each other, a netting including a central body section, means for connecting the central body section to the hoops, and end conical sections, and means for resiliently and detachably connecting the apex portions of the conical sections together.

5. A trap comprising a pair of rigid end hoops, means connecting the hoops together for permitting the same to be moved toward and away from each other, a net including a main cylindrical body section, end rings connected to the terminals of the body section and fitted within the end hoops, end conical sections, rings secured to the base portions of the end conical sections and fitted within the end hoops, means hingedly connecting one of the last mentioned rings to one of the end hoops, and means carried by the mentioned hoop for holding the mentioned ring against accidental movement.

6. A collapsible fishing trap comprising a pair of end hoops, an intermediate hoop, a plurality of cross levers pivotally connected together at the point of intersection, means connecting the meeting terminals of the levers together, links pivotally connected to the end hoops and to the free ends of the outer pairs of cross levers, means hingedly connecting the intermediate pair of cross levers to the intermediate hoops, a netting including a central cylindrical section and end conical sections, means connecting the intermediate portion of the cylindrical section to the intermediate hoop and the end portions thereof to the end hoops, and means connecting the conical sections to the end hoops.

7. A fish trap comprising a collapsible frame including end hoops, means connecting the hoops together for permitting the same to be moved toward and away from each other, a net including a cylindrical body section and end conical sections, means connecting the end conical sections and the main body section to the end hoops, relatively small rings connected to the apex portions of the conical sections, outwardly extending arms secured to said rings, eyes formed on said arms, a pair of contractile coil springs, and clips carried by the terminals of the springs arranged to engage said eyes, one of said end conical net sections being disposed for swinging movement outwardly of the cylindrical body section.

8. A fish trap comprising a collapsible frame including a pair of end hoops having their inner edges provided with inwardly extending flanges, an intermediate hoop including a pair of interfitting circular bodies, means connecting said hoops together whereby they may be moved toward and away from each other, a net portion including a cylindrical body section and end conical sections, rings secured to the terminals of the cylindrical body section disposed within the end hoops in engagement with the flanges, and rings secured to the base portions of the conical sections and fitted within the hoops in engagement with the first mentioned rings.

9. A trap comprising in combination, a pair of end hoops, means connecting said hoops together for permitting said hoops to be moved toward and away from each other, a netting including a central body section connected to and extending between said end hoops, and end conical sections carried by said hoops, and outwardly extending feet carried by one of said hoops, whereby said hoop may be held firm by said feet during the movement of the other hoop toward or therefrom.

WILLIAM T. GIBBS.
CHARLES FELDPAUSCH.